(12) United States Patent
Hensel

(10) Patent No.: US 9,220,373 B2
(45) Date of Patent: Dec. 29, 2015

(54) JUICER

(75) Inventor: Keith James Hensel, Lane Cove (AU)

(73) Assignee: Breville Pty Limited, Alexandria, New South Wales (AU)

( * ) Notice: Subject to any disclaimer, the term of this patent is extended or adjusted under 35 U.S.C. 154(b) by 1717 days.

(21) Appl. No.: 10/562,025

(22) PCT Filed: Jun. 24, 2004

(86) PCT No.: PCT/AU2004/000828
§ 371 (c)(1),
(2), (4) Date: Dec. 22, 2005

(87) PCT Pub. No.: WO2005/002404
PCT Pub. Date: Jan. 13, 2005

(65) Prior Publication Data
US 2007/0056450 A1    Mar. 15, 2007

(30) Foreign Application Priority Data

Jul. 2, 2003    (AU) .............................. 2003903367

(51) Int. Cl.
| | | |
|---|---|---|
| *B26D 1/00* | (2006.01) | |
| *A23L 2/02* | (2006.01) | |
| *A47J 43/25* | (2006.01) | |
| *A47J 19/02* | (2006.01) | |
| *A47J 43/07* | (2006.01) | |
| *A47J 36/06* | (2006.01) | |

(52) U.S. Cl.
CPC ............... *A47J 43/255* (2013.01); *A47J 19/02* (2013.01); *A47J 19/027* (2013.01); *A47J 43/0716* (2013.01); *A47J 36/06* (2013.01)

(58) Field of Classification Search
CPC ......... A47J 19/02; A47J 19/027; A47J 36/06; A47J 43/0716; A47J 43/255
USPC ...................... 99/509–513; 210/360.1, 380.1; 366/314; 426/51, 478, 479, 489
See application file for complete search history.

(56) References Cited

U.S. PATENT DOCUMENTS

| | | | | |
|---|---|---|---|---|
| 2,188,362 | A * | 1/1940 | Krilow | 30/113.3 |
| 2,289,656 | A * | 7/1942 | Knapp | 99/512 |
| 2,590,237 | A * | 3/1952 | Doering | 99/503 |
| 4,333,393 | A * | 6/1982 | Hancock et al. | 99/277.2 |
| 4,572,445 | A * | 2/1986 | Cristante | 241/37.5 |
| 5,317,964 | A * | 6/1994 | Prudhomme | 99/495 |
| 5,479,851 | A * | 1/1996 | McClean et al. | 99/512 |
| 5,495,795 | A * | 3/1996 | Harrison et al. | 99/492 |
| 5,524,906 | A * | 6/1996 | Rackov et al. | 277/609 |
| 5,636,923 | A * | 6/1997 | Nejat-Bina | 366/205 |
| 6,397,736 | B1 * | 6/2002 | Tseng et al. | 99/511 |

FOREIGN PATENT DOCUMENTS

| | | |
|---|---|---|
| AU | 2004253180 B2 | 1/2005 |
| WO | 2005/002404 A1 | 1/2005 |

* cited by examiner

*Primary Examiner* — Sang Y Paik
(74) *Attorney, Agent, or Firm* — Molins and Co. Pty. Ltd.

(57) ABSTRACT

A lid (12) of a juicer provides several important functions. It prevents juice from escaping, it diverts pulp efficiently toward a collector (13) or chute (150), it cooperates with a locking bar to keep the device safe and closed and it provides a platform for the feed tube. The lid (12) comprises a polymeric cap (52) (for example a polycarbonate) to which is secured a metal, preferably stainless steel feed tube (51). Importantly the combination of clear cap (52) and steel feed tube provides all of the advantages of both, that is, adequate strength in the feed tube and knife and the ability to see under the cap.

18 Claims, 14 Drawing Sheets

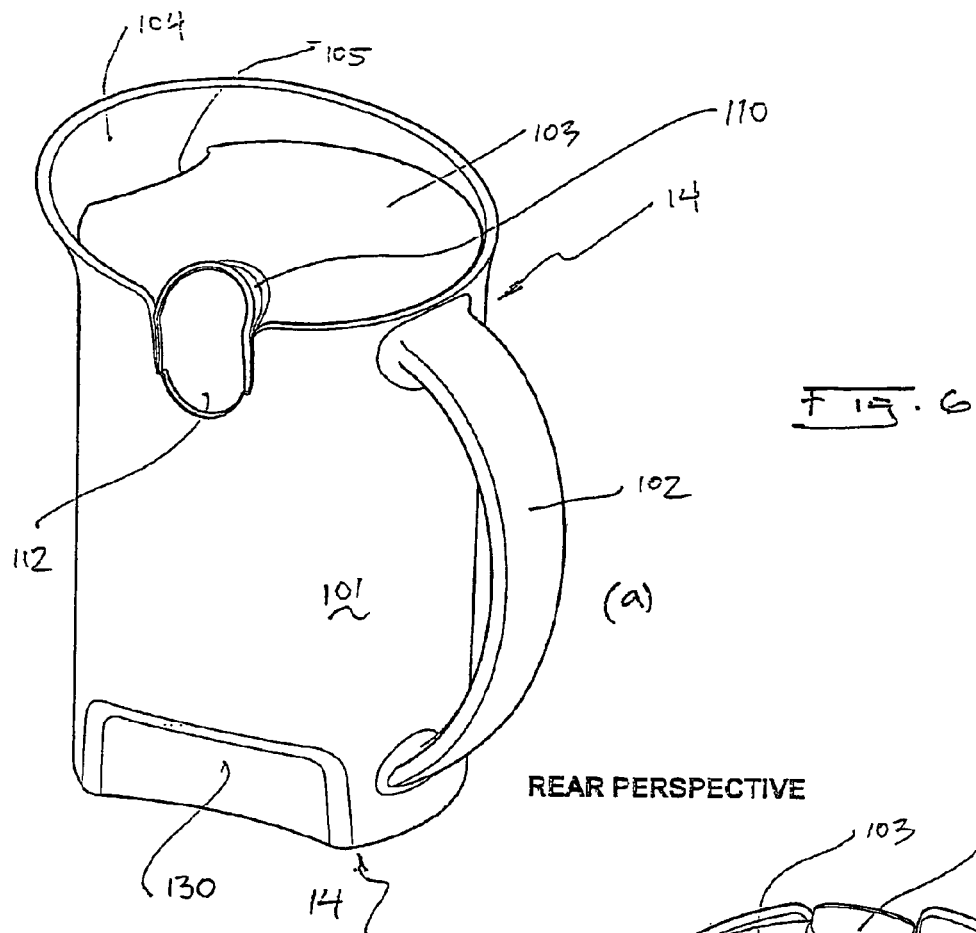
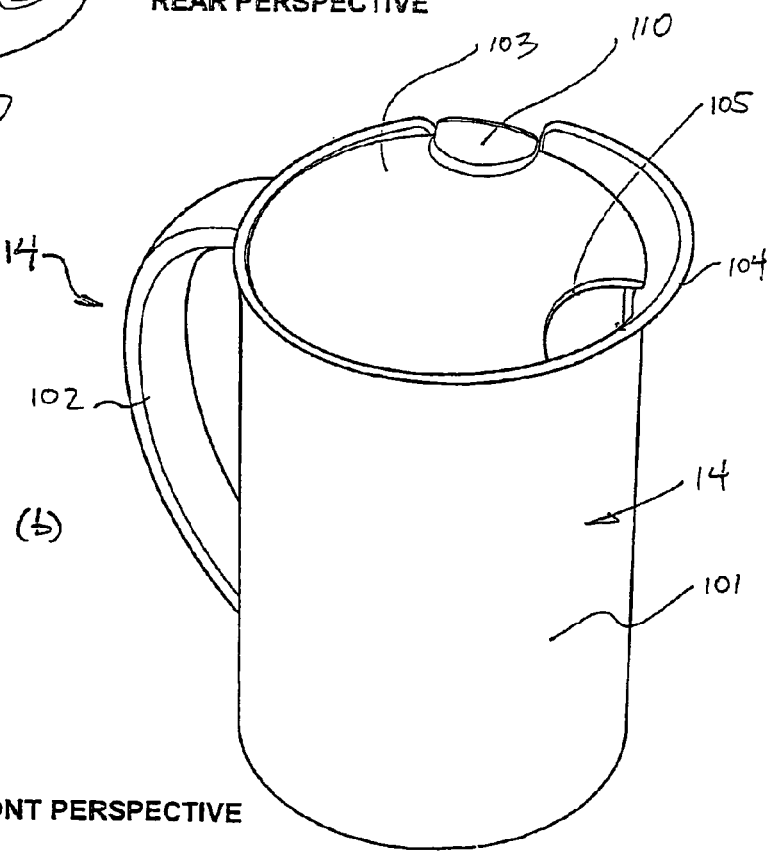
Fig. 6
(a) REAR PERSPECTIVE
(b) FRONT PERSPECTIVE

JUICER

FIELD OF THE INVENTION

Invention pertains to juicers and more particularly to a juicer for fruit and vegetables.

BACKGROUND OF THE INVENTION

Fruit and vegetable juicers are well known. Appliances of this kind are sometimes prone to leakage of the extracted juice from within the confines of the juicer's casing Juicers are also known to vibrate and therefore move on the bench top on which they are placed. In existing juicers, the lid and feed tube are generally integrally molded from a polymer material. The polymer having the advantage that it can be moulded in a transparent material to view the flow of pulp to ensure there are no blockages. Where the feed tube includes an internal knife, this is also a part of the unitary molding. Steel is stronger than the moulded polymers used for this purpose but forming the complex shapes required to fabricate the lid, feed tube and knife have not previously been solved.

OBJECTS AND SUMMARY OF THE INVENTION

The object of the invention is to address some of the shortcomings of the prior art for the purpose of providing a superior or commercially more acceptable alternative to known juicing appliances

BRIEF DESCRIPTION OF THE DRAWING FIGURES

FIGS. 6(a&b) are front and rear perspectives of a juice jug;

FIG. 14(a) is a perspective view of a pusher, partially exploded.

BEST MODE AND OTHER EMBODIMENTS OF THE INVENTION

General

Figure 1:
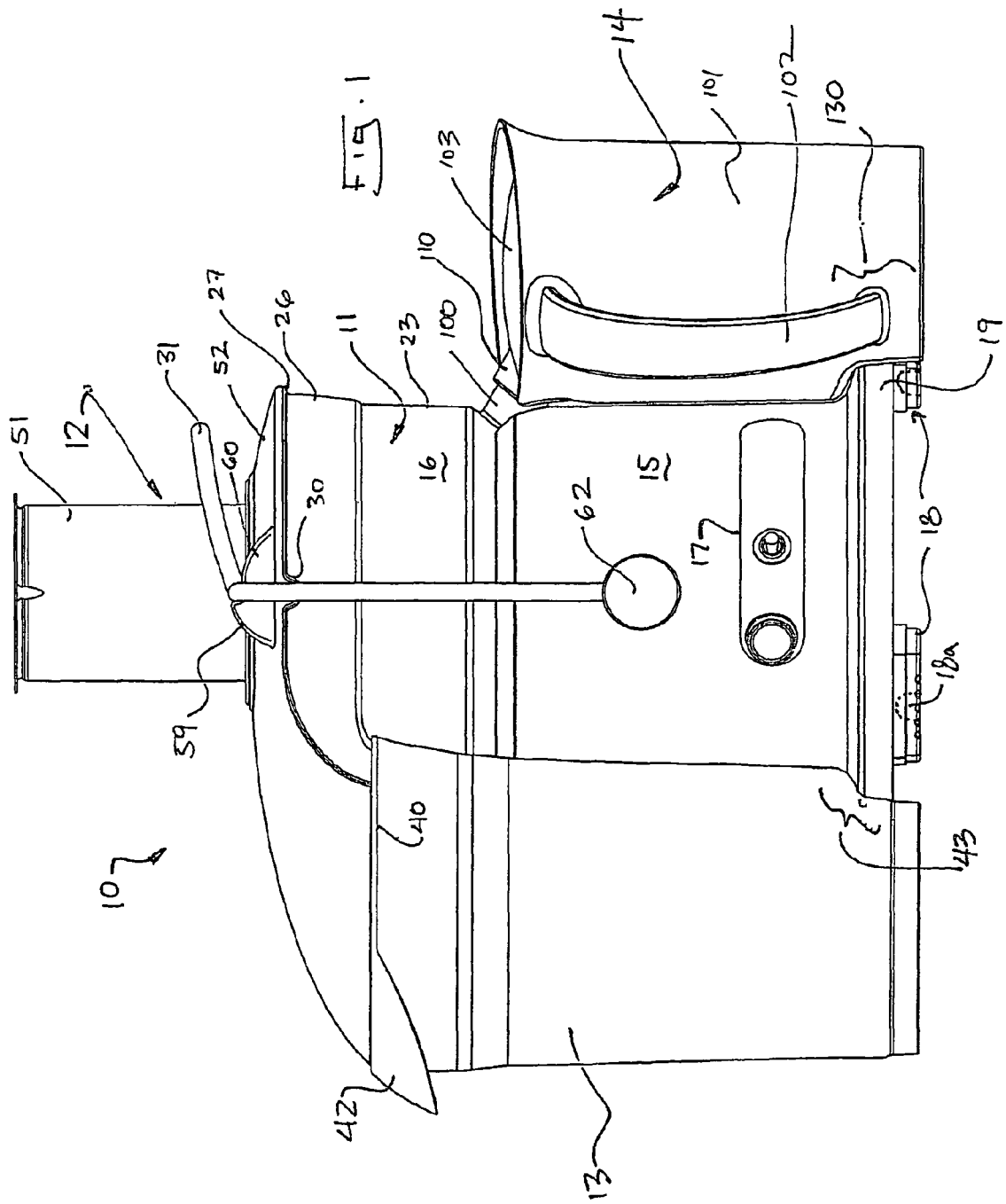
FIG. 1 is a front elevation of a juicer, pulp collector and juice collecting jug according to the teachings of the present invention.

As shown in FIG. 1, a juicer 10 comprises a housing 11 a lid with feed tube 12, a pulp collector 13 and a collection jug 14. A motor within the housing spins a grating disk 20 located under the feed tube 12.

The housing 11 further consists of a lower compartment 15 and an upper compartment or juice collector 16. The lower compartment 15 houses the juicer's motor, controls 17 and power supply. The lower compartment 15 further includes a lower rim 19 that is flared outward. For maximum stability, the device's feet 18 are mounted under the flared rim 19. In preferred embodiments, the feet have rubber bottoms in which are formed indentations 18a, as will be explained.

Juice Collector

Figure 2:
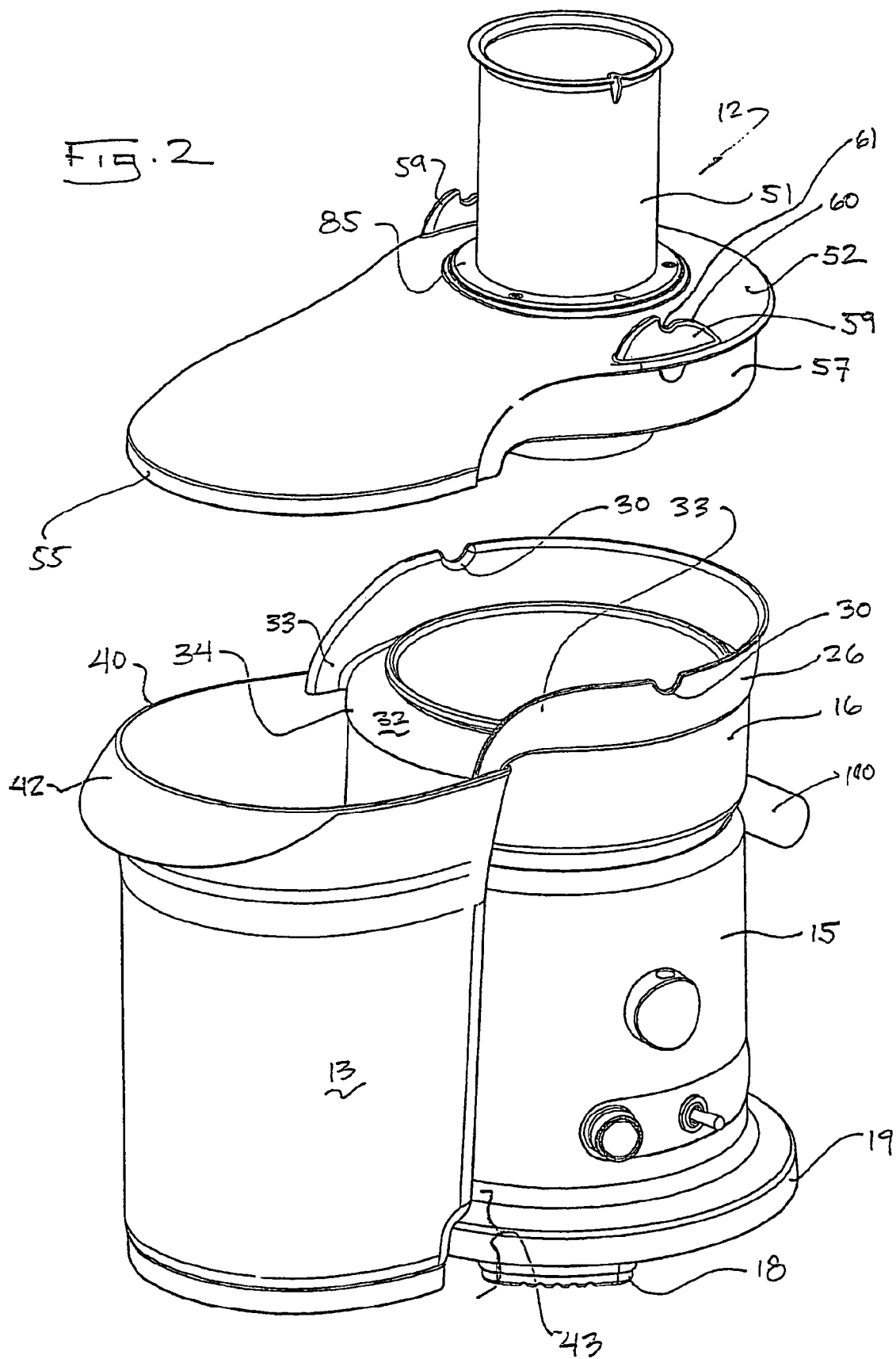
FIG. 2 is a perspective view of a juicer with the lid off.
Figure 3:
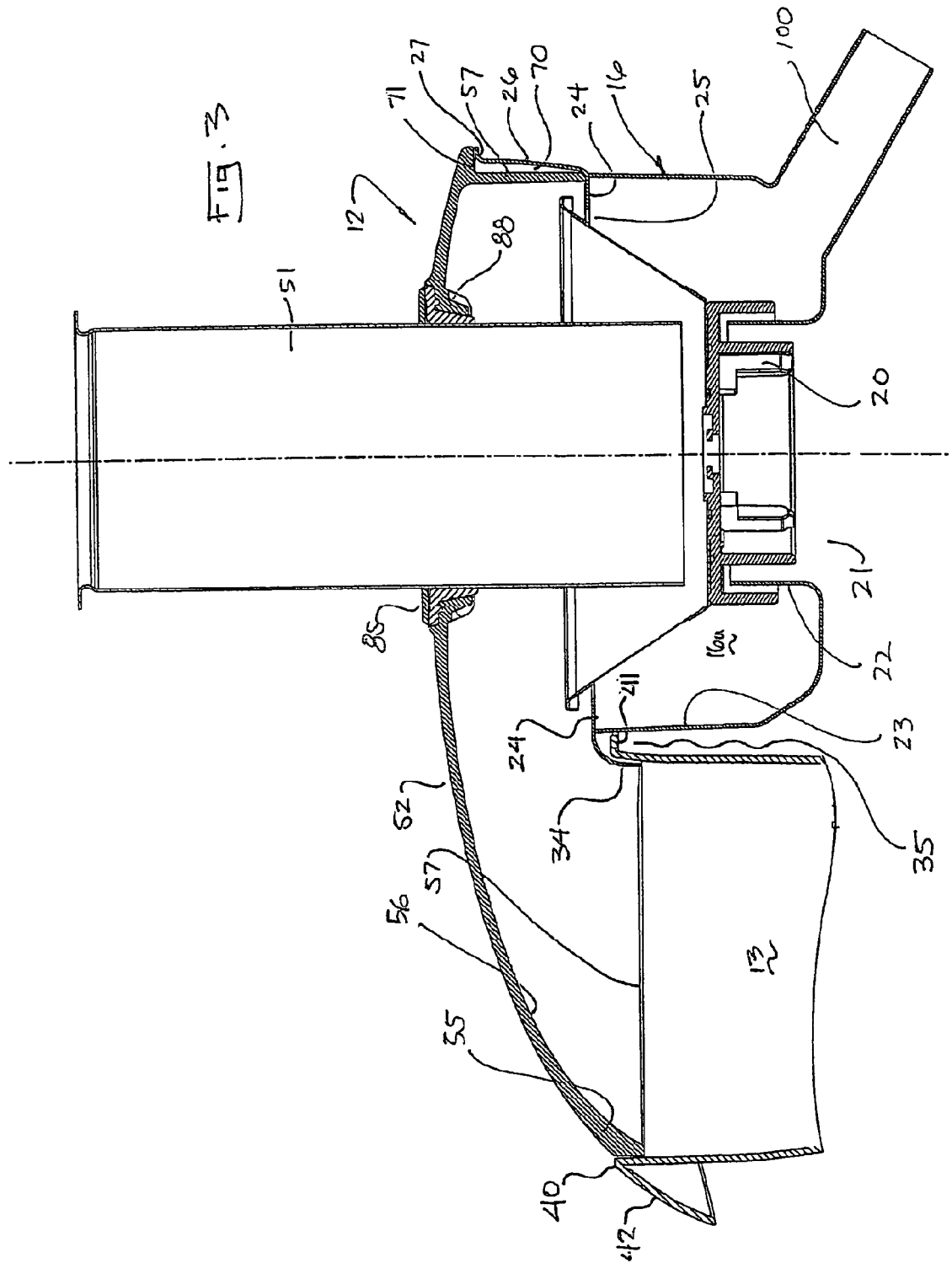
FIG. 3 is a cross sectional view of the top of the juicer depicted in FIG. 1.
Figure 4:
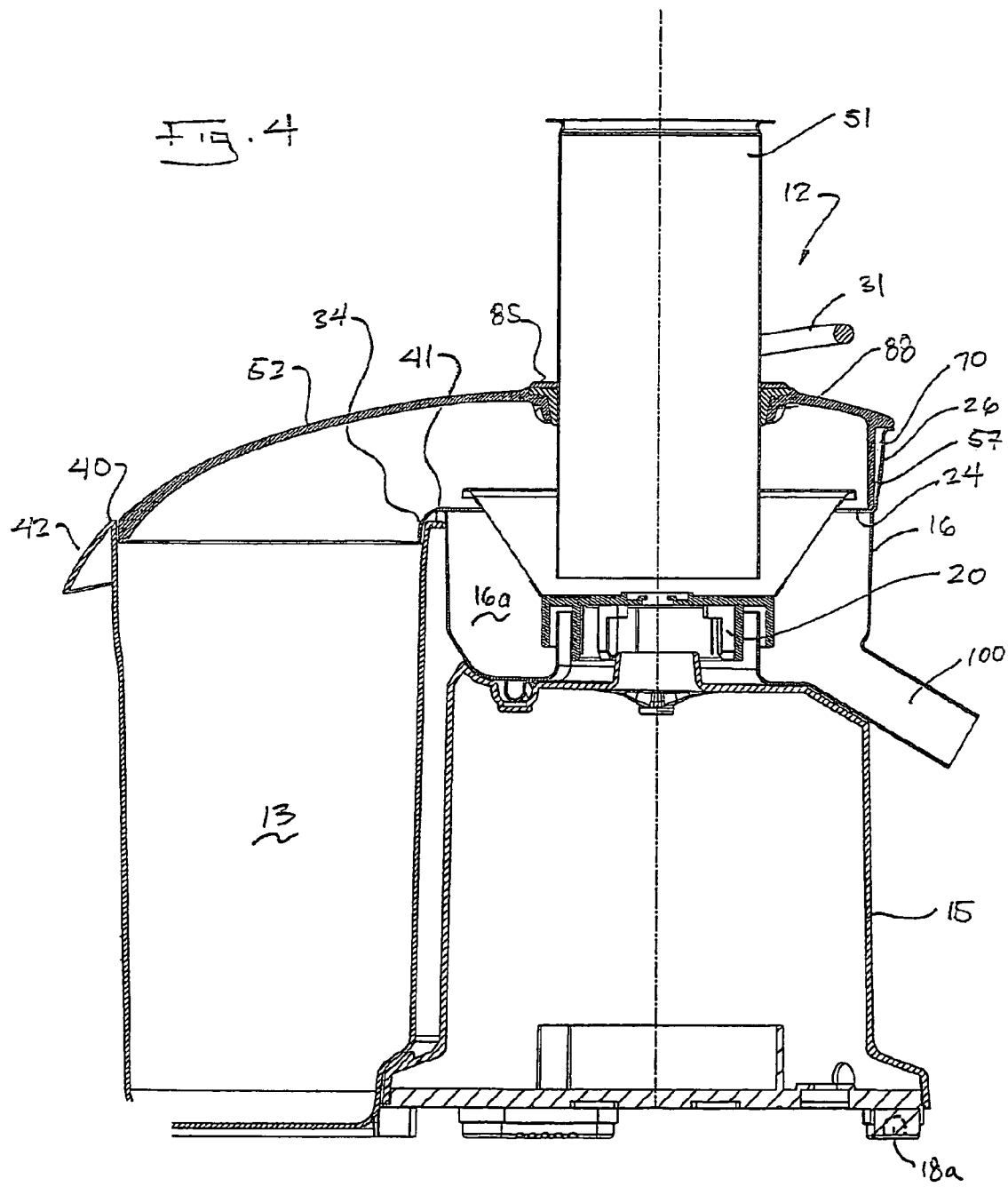
FIG. 4 is a front cross sectional view of a juicer and pulp collector.
Figure 5:
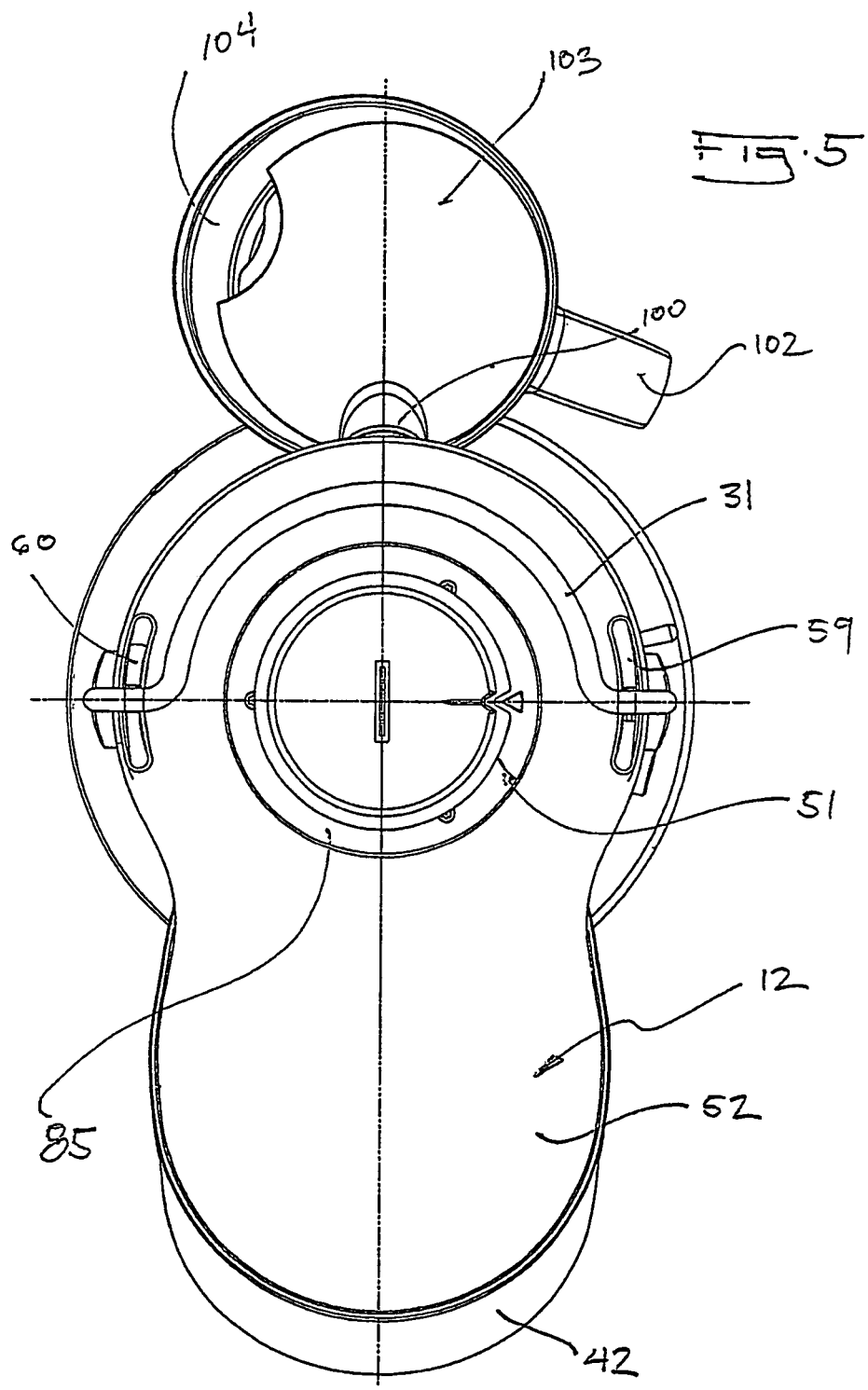
FIG. 5 is a top plan view of the device depicted in FIG. 1.

As shown in FIGS. 1-4 the upper compartment or juice collector is a removable component preferably fabricated from stainless steel. As seen in FIG. 3, the interior compartment or collection reservoir 16a of the juice collector 16 comprises a central opening 21 that is surrounded by an upturned rim 22. The collection reservoir of the juice collector 16 is defined by an exterior wall 23. The upper extremity of the interior compartment is defined by a horizontal rim 24 that surrounds a central opening 25. This rim 24 prevents juice from escaping from, and pulp from entering the reservoir 16a. Integral with the exterior wall 23 and horizontal rim 24 is a juice stopping rim 26 which is inclined slightly from the vertical and which terminates in the 'U' or "J" shaped rim 27.

As shown better in FIG. 2, the juice-stopping ring 26 includes a pair of opposed indentations 30 for locating tabs protruding from the underside of the lid to orientate the lid with respect to the juice collector. It will be observed that the juice-stopping rim 26 does not completely surround the juice collector's sidewall 23. Instead, the juice-stopping ring 26 includes a gap 32. The sides of the gap 32 are defined by the tapered or rolled off portions of 33 of the juice-stopping ring 26 and thereby define a spout. This spout further comprises a down turned lip portion 34, which is shown in FIG. 3 and extends below the level of the horizontal rim 24. Accordingly, a gap 35 is formed between the lip 34 and the sidewall 23 that gap is able to accommodate a rim of the pulp collector 13 or a pulp disposal chute as will be further explained. These features provide for a highly efficient flow of waste pulp into the collector 13 or chute.

Pulp Collector

As shown in FIGS. 1-4 and 10, the pulp collector 13 comprises a container with a generally 'D' shaped cross section that conforms to the exterior of the housing 11. In preferred embodiments, the upper rim 40 of the pulp collector 13 includes an arcuate or concave portion adjacent (in use) to the housing 11. As shown in FIG. 3, the concave portion 41 of the rim 40 closely conforms to the outer surface of the sidewall 23 and fits into the gap 35 defined by the descending lip 34 and the sidewall 23. The upper rim 40 also includes an enlargement 42 that forms a convenient grip. In preferred embodiments one entire side of the pulp collector 13 is concave so to conform to the exterior shape of the housing 11. It is also preferred that a lower portion 43 of the collector 13, adjacent the housing 11 be indented so as to conform with the enlarged rim 19 of the housing 11. Importantly, when the pulp collector 13 is in use, both the descending lip 34 of the spout 32 and the sidewall portions 33 extend below the level of the upper rim 40 of the collector 13.

The top inside surface of the pulp collector 40 must closely fit the surfaces of the lid to prevent the leakage of air and fluids 52. This can make the pulp collector difficult to remove. To overcome this the interior of the pulp collector 40 also has one or more vertical ribs 140 near it rim 40 as shown in FIGS. 2 and 3. When the handle 42 of the pulp collector is lifted, this rib acts on the cap as fulcrum to prevent the pulp container from jamming up onto the lid and causing the lip 41 to pivot downward so that the collector is easily removed.

Lid and Feed Tube

The lid 12 of the device provides several important functions. It prevents juice from escaping, it diverts pulp efficiently toward the collector 13 or chute 150 (FIG. 11), it cooperates with a locking bar 31 to keep the device safe and closed and it provides a platform for the feed tube 51. As shown in FIGS. 1-5 and 8-11, the lid 12 comprises a polymeric cap 52 (for example a polycarbonate) to which is secured a metal, preferably stainless steel (feed tube) 51. As seen from above and as shown best in FIG. 5, the cap 52 includes 2 primary lobes and assumes the shape of a figure "8" when seen from above. The larger lobe primarily covers the juice collector and the smaller lobe primarily covers the pulp collector 13 or chute 150. Importantly the combination of clear cap 52 and steel feed tube provides all of the advantages of both, that is, adequate strength in the feed tube and knife and the ability to see under the cap.

As shown in FIG. 3, the perimeter of the cap 52, where it contacts the interior of the pulp collector 13 or chute 150 is enlarged 55. This enlargement 55 serves to increase the contact area between the cap 52 and the chute 150 or collector 13 while at the same time preserving a smooth and continuous internal surface 56 that leads from the area above the juice collector to the exit area 57 of the cap 52. By providing a smooth, transitionless and continuously curving interior surface 56, the cap 52 assists in guiding pulp into the pulp collector 13 or chute 150 without creating air turbulence or discontinuities in the flow path of the pulp which tends to adhere to the under surface of the cap. The enlargement or rim thickening 55 also ensures there is no space or "well" above the surface for juice to collect and eventually get blown out.

As shown in FIG. 2, the cap also includes a descending rim 57 that cooperates with the juice-stopping rim 26 and generally follows its perimeter contour around the juice collector except in the area of the spout 32. As shown in FIGS. 3-4 and 8-11, the descending rim 57 of the lid 12 extends to the upper surface of the horizontal rim 24 of the juice collector 16 to form a seal. The angle between the outer surface of the descending rim and the inter surface of the juice stopping ring 26 creates a gap 70 because the rim 57 is more vertical than the ring 26. In preferred embodiments, this gap is tapered having its narrowest portion at the bottom and the widest portion at the top. In prior devices and where this gap has been too narrow, juice falling to the bottom of lid's rim would be blown by internal air pressure out of the gap and therefore out of the device. By providing a tapered gap, it is considered that lower air escape velocities and pressure drop within the gap 70, cause juice to collect in the gap rather than be expelled from it. This juice then drains into the pulp container via the juice collector spout 32, 34. This makes the device easier to use and clean. The juice trapping capability of the lid 12 is enhanced by providing a horizontal shoulder 71 in the rim of the cap for the purpose of capping the rim 27 of the juice-stopping ring.

The upper surface of the cap 52 features a pair of opposed cam surfaces 59. Each cam surface 59 includes a ramp portion 60 and a detent 61. As is known in devices of this kind, a locking bar 31 is mounted on a pivot 62 that is adapted to both rotate and translate vertically as the underside of the locking bar 31 rides up the ramp 60. This motion of the pivot 62 trips a safety switch, preventing power from reaching the motor unless the locking bar 31 is in it's closed position. As previously mentioned, the lid also serves as a means of locating and supporting the feed tube 51. In preferred embodiments the cap 52 is a transparent polymer such as a polycarbonate or SAN (a styrenic). As shown in FIGS. 8-10 and 12-13, the cap 52 includes a central opening 80 which accommodates a stainless steel feed tube 51. As shown in those figures, the lower interior of the tube 51 is equipped with a tapered knife 81 that is welded into or onto the tube 51. Because the gap 82 between the bottom of the feed tube 83 and the cutting disc at the base of the filter basket 84 is relatively small, the knife 81 helps to restrain large fruits such apples from tumbling uncontrollably when being juiced by the filter basket.

Figure 13:
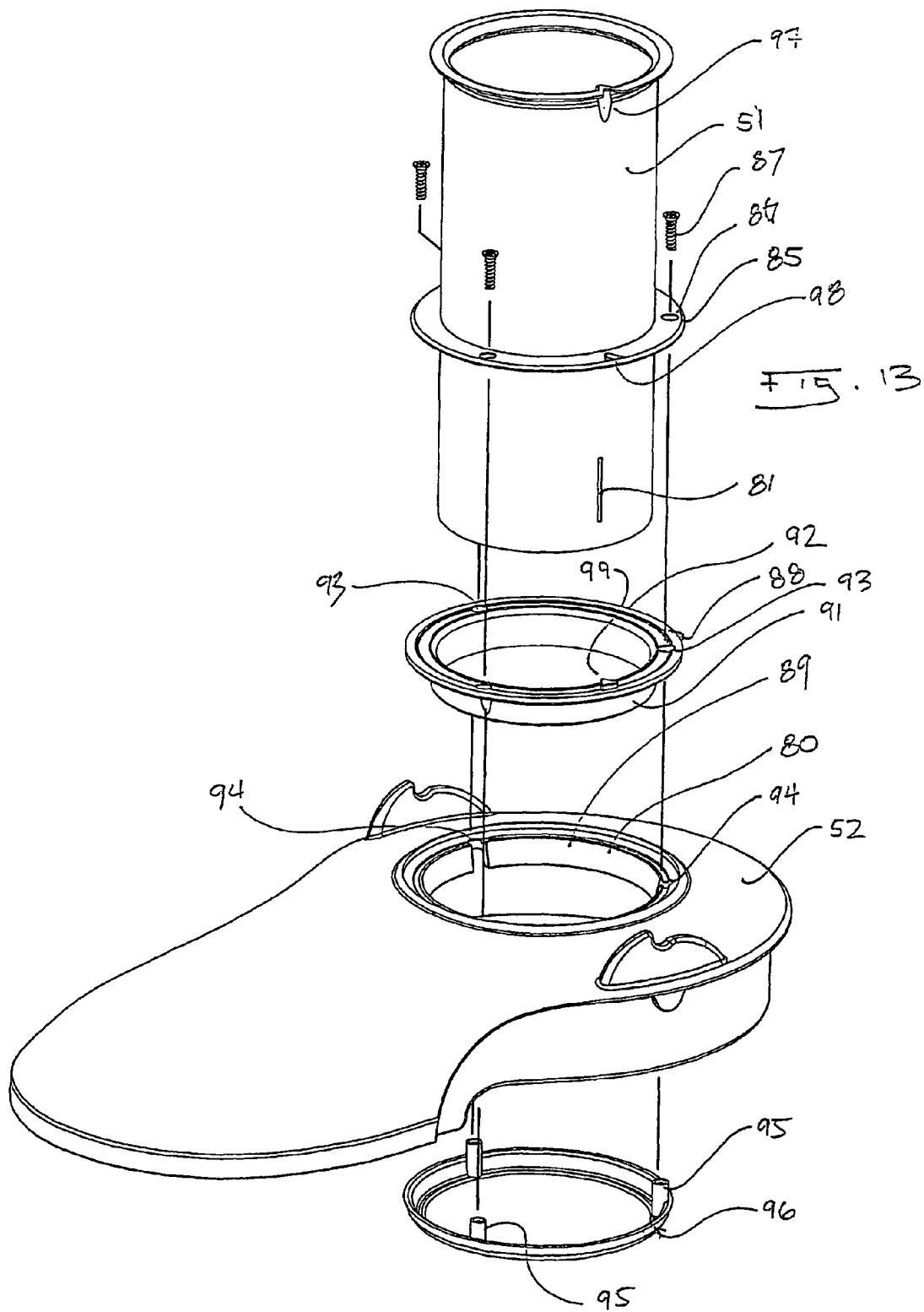
FIG. 13 is an exploded perspective of the lid.

As shown in FIG. 13, in order for the cap 52 to restrain the feed tube 51, the feed tube 51 is provided with a circumferential flange 85. The flange 85 has through openings 86 through which pass threaded fasteners 87. A sealing gasket 88 fits between the feed tube 51 and the internal rim 89 of the opening 80. The gasket 88 includes a neck 91 and a surrounding ring 92. The neck 89 seals between the feed tube 51 and the opening's vertical rim 89. The ring portion 92 seals between the flange 85 and the top of the cap 52. The ring portion 92 of the gasket also includes through openings 93 through which the fasteners 87 pass. The fasteners 87 may also pass through recesses 94 formed in the periphery of the opening 80 so as to extend into screw bosses 95 formed in a retaining ring 96 which sits below the cap 52. In this way the gasket 88 is sandwiched in between the feed tube's flange 85 and the retaining ring 96. In preferred embodiments, the ring 96 is made from nylon or another tough plastic that is resistant to cracking and crack propagation. This combination of materials ensures the lid assembly is dishwasher safe.

Figure 14:
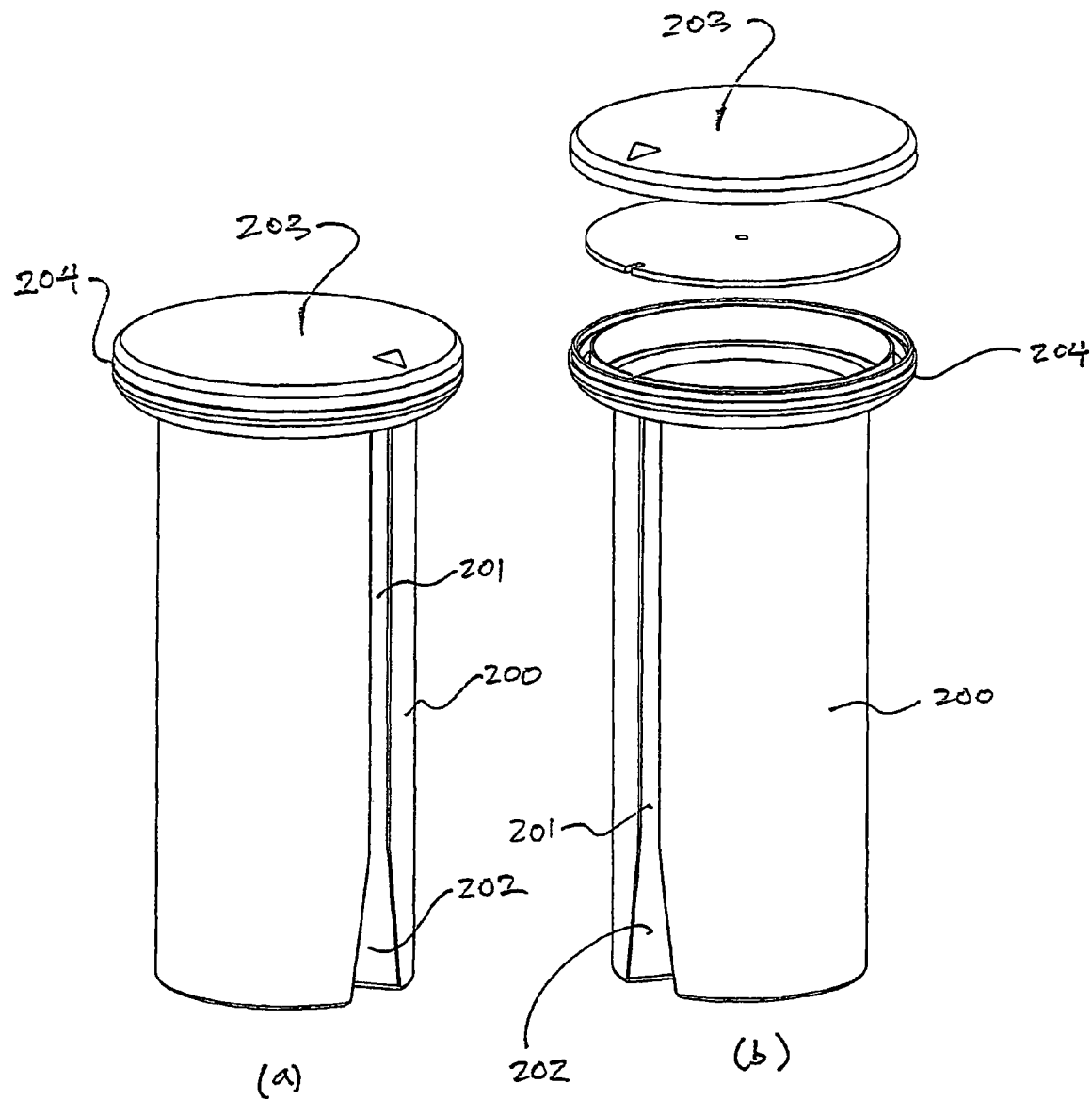
FIG. 14(a) is a perspective view of a pusher.

Also note that the feed tube 51 carries 2 distinct orientation markers that assist in the proper location of the pusher. A first marker 97 is physically formed on the upper rim of the feet tube 51 and a second marker comprises an opening 98 such as a triangular opening formed in the flange 85. The opening 98 cooperates with a similarly shaped bulge 99 formed on the upper surface of the gasket 88. In this way the bulge 99 resides within and is visible in the opening 98 and provides a visual contrast to the stainless steel finish of the flange 85. The first marker interferes with the insertion of the pusher unless the pusher is oriented properly. As shown in FIG. 14, the pusher 200 is sized to enter the feed tube 51, but only when the pusher's longitudinal slot 201 is aligned with the knife 81. Thus the first marker 97 is aligned with the knife and is able to enter the slot 201. The bottom 202 of the slot is enlarged to make inserting the pusher into the feed tube easier. So that the pusher has a better feel, the upper knob or bulb 203 is enlarged, provided with a rubber grip ring 204 and also provided with an internal weight such as a metal disk 205.

Collection Jug

Figure 7:
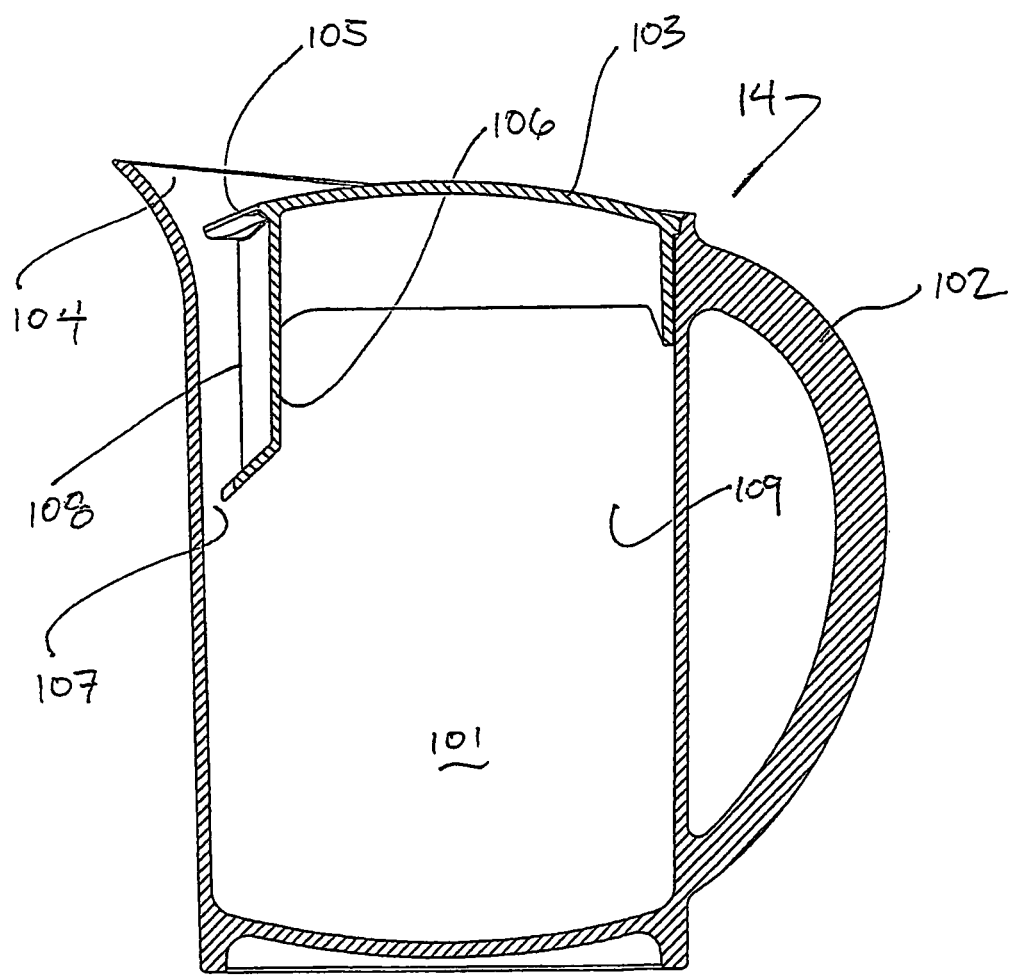
FIG. 7 is a cross sectional view of the jug depicted in FIGS. 6(a) and 6(b)
Figure 8:
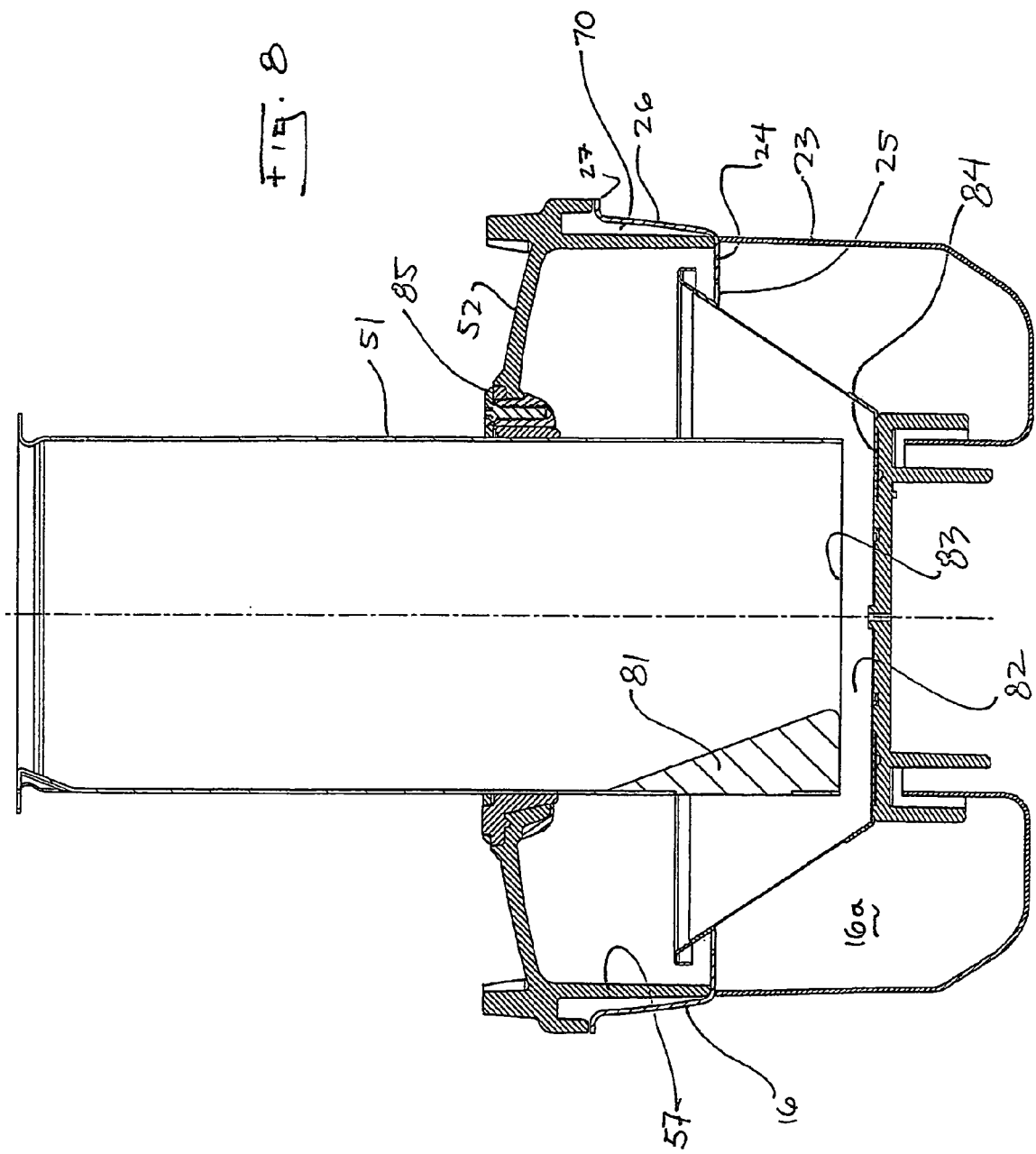
FIG. 8 is a cross sectional view through the lid, feed tube and knife.
Figure 9:
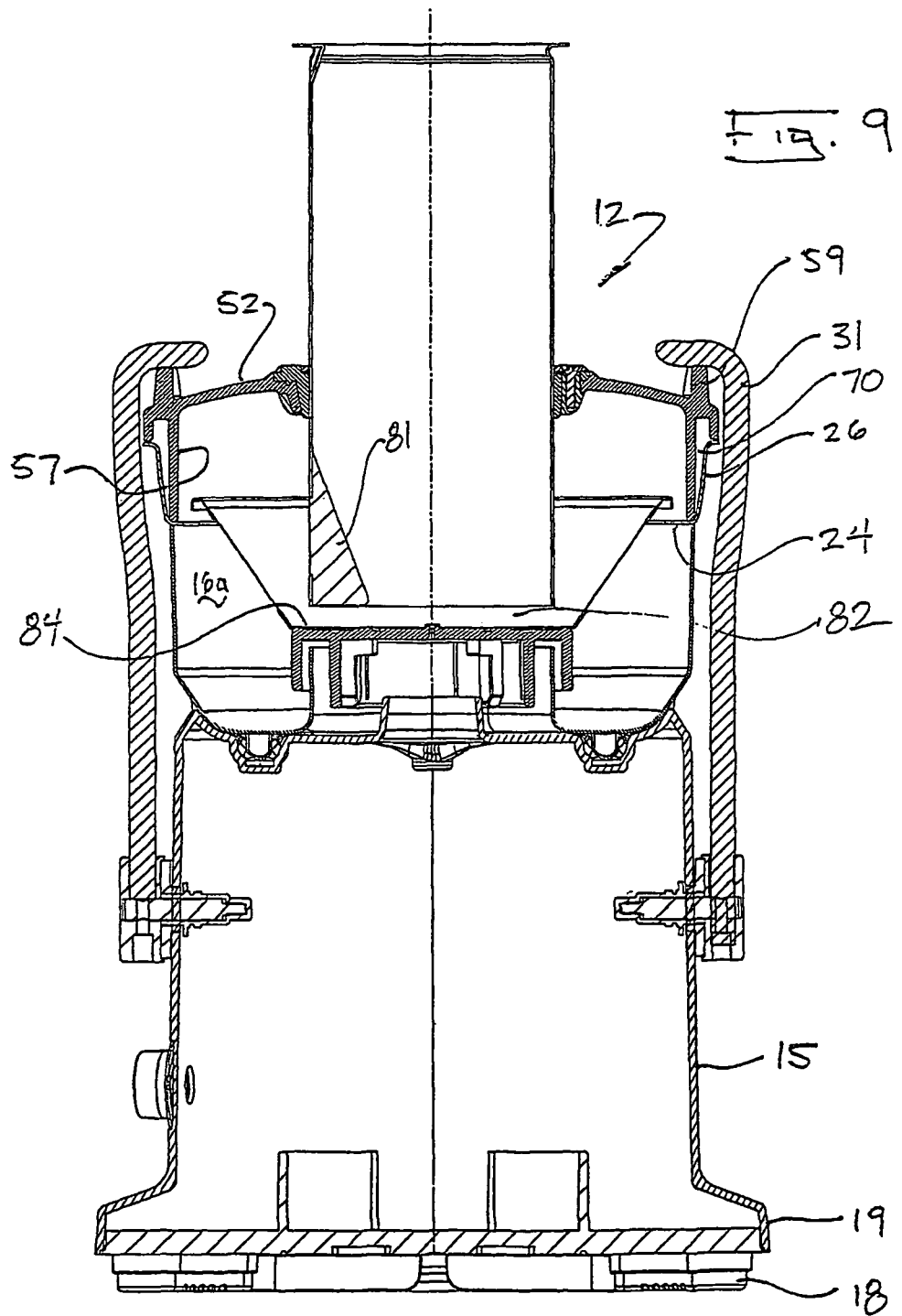
FIG. 9 is a cross sectional view through the juicer.
Figure 10:
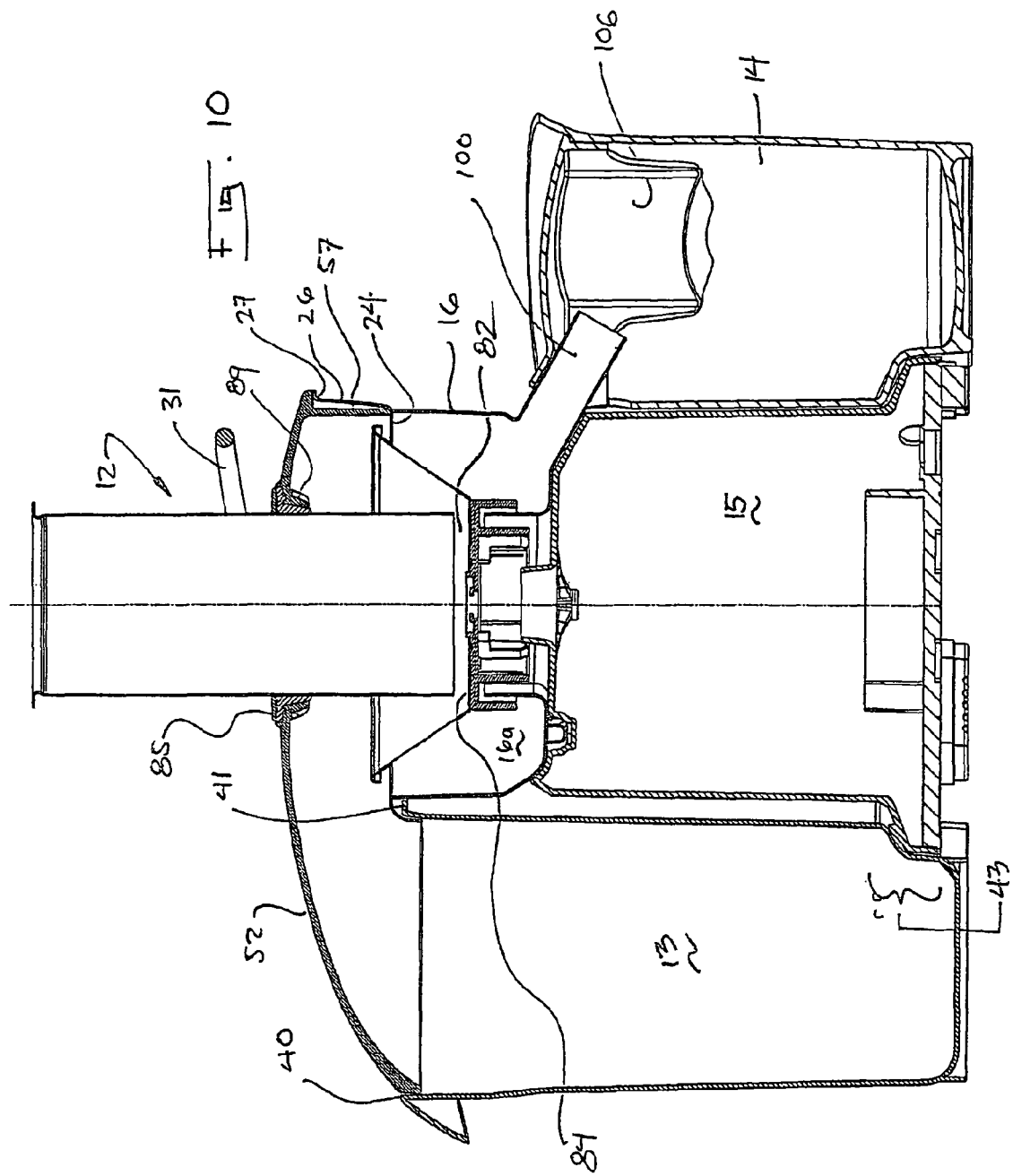
FIG. 10 is a cross sectional view of the device depicted in FIG. 1.

As shown in FIGS. 1, 6, 7 and 10, the utility of the juicer is enhanced by providing a specially configured collection jug 14. As suggested by FIG. 1, the juice collection compartment 16 includes a tubular output 100 that exits the juice collector from a low point. The jug 14 comprises a body 101, a handle 102 and a lid 103. The handle 102 defines the rear of the jug. Opposite the handle 102, the jug has a spout 104 that defines the front of the jug. The lid 103 has a scalloped exit or relief portion 105 that is generally in alignment with the spout 104. Integral with the lid 103 and located generally below the scalloped portion 105, the lid also includes a pour shield 106. As shown in FIG. 7, the shield 106 extends downwardly from the under-surface of the lid 103 and forms an entry opening 107 that leads to the spout 104. The bulk of liquids being poured from the jug pass through the entry opening 107 and are generally inhibited from any other flow path because of the line contact between the sides 108 of the shield and the interior surface 109 of the jug. In the way, foam which may appear on the surface of fruit and vegetable juices is not dispensed while liquids from below the surface are able to enter the entry opening 107 and exit through the scalloped portion 105. The lid also has a second relief 110 that cooperates with a gap 112 in the upper rim of the jug 14 to form a port that the output spout tube 100 can enter. Note that the gap or juice entry point is located on the side of the jug and therefore does not interfere with the handle or spout. The orientation of this gap 112 is not on the jug centerline, but closer to the handle so when the jug is tilted on an angle for pouring the level of juice with respect to this gap 112 lowers and therefore does leak from the gap when the jug is poured. The bottom of the jug 130, in the area under the gap 112 is relieved so that the jug can straddle the housing's rim 19. This allows the jug to be located nearer to the housing. After pouring the juice from the spout 104, the remaining foam/froth can be poured from the jug without removing the cap though the gap opening 112.

Mounting Tray and Chute

Figure 11:
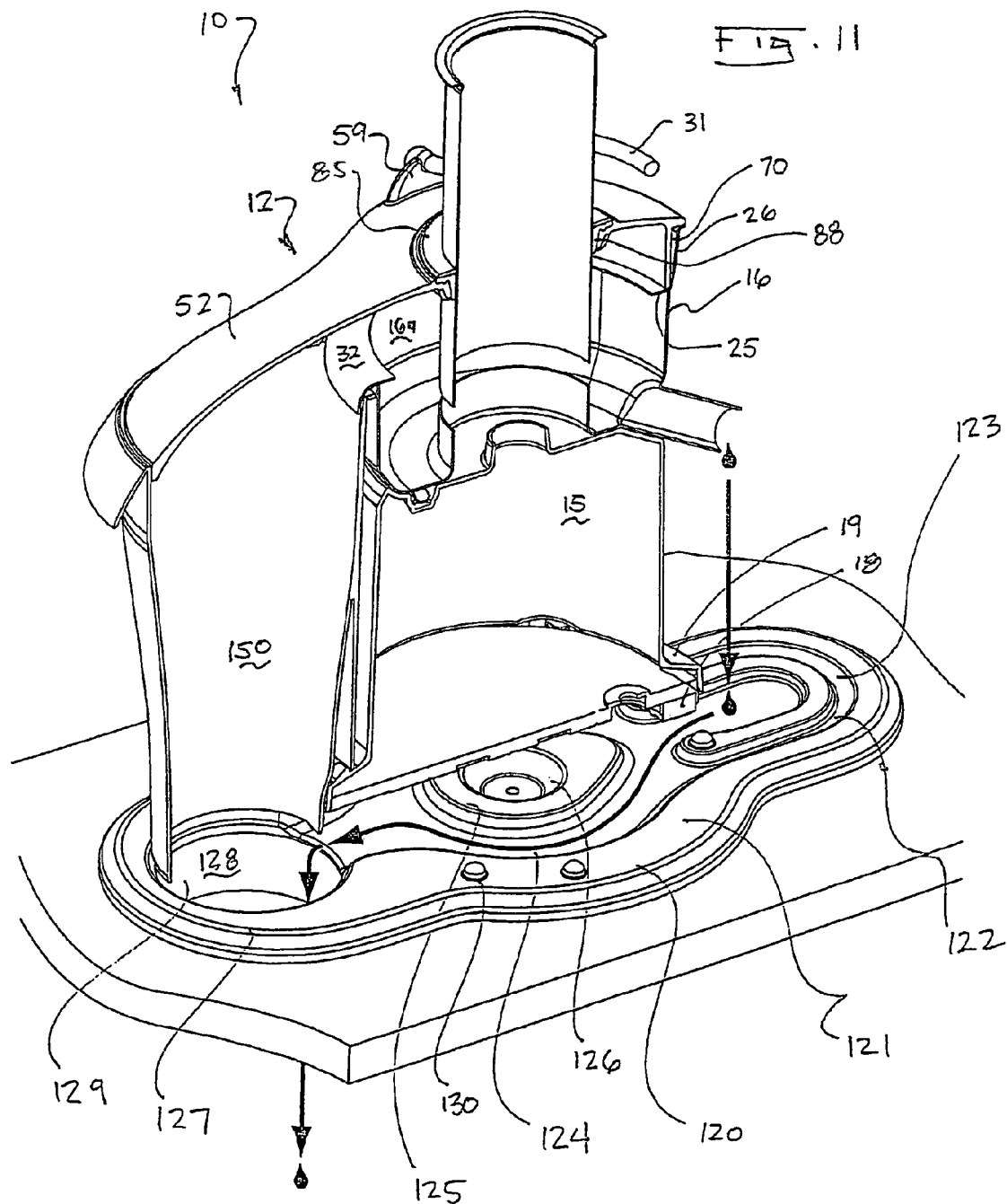
FIG. 11 is a partially cross-sectioned view of a juicer, and a specially configured stand.
Figure 12:
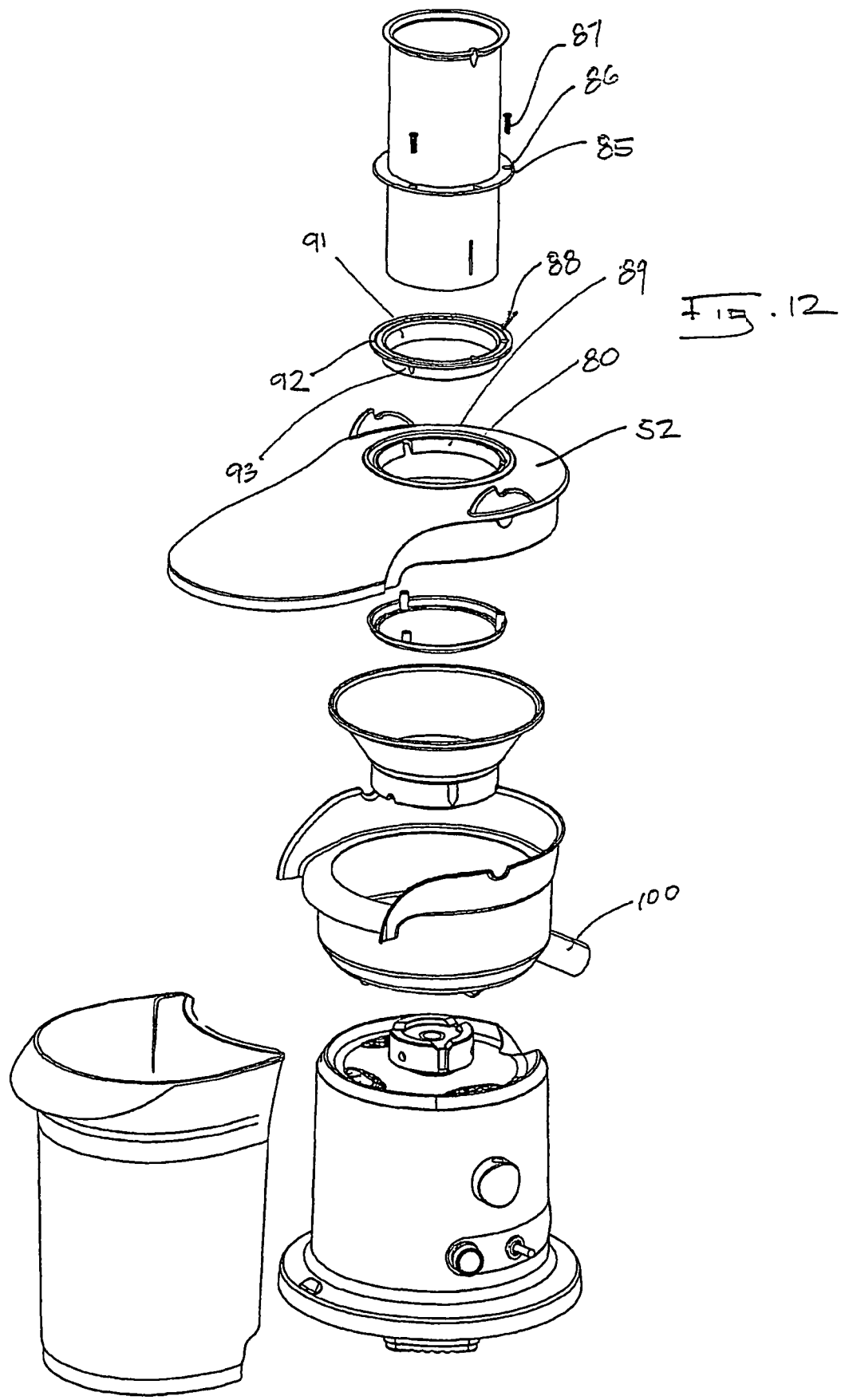
FIG. 12 is an exploded perspective view of a juicer according to teachings of the present invention.

As shown in FIG. 11 a bench top mounting tray 120 may be used in conjunction with the juicer 10 of the present invention. The pressed steel or moulded tray has 3 primary functions. It stabilises the juicer from excessive movement on the bench top, it locates the juicer over a discharge opening for pulp disposal and it collects fluid drippings.

The tray comprises a contoured surface 121 in which is formed drain channels 122. Rear channels 123 are formed in the area that surrounds the jug 14. A central channel conforms to the underside of the housing 11. An island 125 with a central depression 126 is formed centrally of the tray. The front end 127 of the tray includes an exit opening 128 that is defined by a cylindrical guide or collar 129 that extends below the bottom surface of the tray. The collar fits into a cooperating hole in a bench top and thereby serves to locate the collar 129 and thus the tray with respect to the hole in the bench top. Bumps 103 formed on the upper surface of the tray interlock with cooperating depressions 18a formed into the feet 18. In this way, the juicer's housing positively interlocks with the tray. This same arrangement can be provided in the converse, that is, with bumps on the feet and depressions in the tray. In this way, juice drippings are collected in the channels 122, 124 and proceed around the island 125 so as to avoid the motor's exhaust and run into the discharge opening 129. With the housing properly located on the tray, the discharge opening 129 lies directly below the smaller lobe of the cap 52. In this way a discharge cylinder or chute 150 may be attached to the rim of the cap and extend into engagement with or pilot into the discharge opening 129. This allows pulp waste to be discharged directly from the juicer through the bench top into a conduit or waste receptacle.

What is claimed is:

1. A lid for an electric juicing device, the lid comprising:
a polymeric cap in which is formed an opening;
the opening accommodating and having attached to it, a metal feed tube;
the feed tube having a circumferential flange that is affixed to the cap a gasket being interposed between the flange and the cap; and
the gasket further comprising a neck and a surrounding ring, the neck sealing between the feed tube and a vertical rim of the cap.

2. The lid of claim 1, wherein;
an interior of the feed tube has attached to it a tapered metal knife.

3. The lid of claim 1, wherein:
fasteners extend through the flange into a retaining ring which is located adjacent to an under side of the cap.

4. The lid of claim 1, wherein:
fasteners extend though the flange and the surrounding ring of the gasket and through the cap into a retaining ring which is located adjacent to an under side of the cap.

5. The lid of claim 1, wherein:
the cap has an undersurface that forms a smooth and continuous surface that extends from above a juice collection area to a pulp exit area of the cap, the lid acting to divert pulp to a pulp collector.

6. The lid of claim 1, wherein;
the cap has a descending rim that cooperates with a juice stopping rim of a juice collector;
an angle between an outer surface of the descending rim and an inner surface of the juice stopping rim creating a tapered gap that is most narrow at the bottom.

7. The juicing device of claim 1, wherein:
an upper surface of the cap further comprises at least one cam surface and detent for receiving a locking bar.

8. A lid for an electric juicing device, the lid comprising:
(a) a polymeric cap in which is formed an opening;
(b) a metal feed tube, accommodated into and attached to the opening, wherein the feed tube has a circumferential flange that is affixed to the cap;
(c) a gasket interposed between the flange and the cap, wherein the gasket comprises a neck and a surrounding ring, the neck sealing between the feed tube and a vertical rim of the cap; and
(d) a metal knife attached to a lower interior of the metal feed tube.

9. A lid of claim 8, wherein the knife is welded into or onto the feed tube.

10. A lid of claim 8, further comprising:
(e) a pusher having a longitudinal slot, wherein the pusher is sized to enter the feed tube only when the longitudinal slot is aligned with the knife.

11. A lid of claim 8, wherein the feed tube further comprises an upper rim having a marker formed therein, wherein the marker interferes with insertion of the pusher unless the pusher is oriented so that the slot is aligned with the knife.

12. The lid of claim 8, wherein fasteners extend through the flange into a retaining ring that is located adjacent to an under side of the cap.

13. The lid of claim 8, wherein fasteners extend though the flange and the surrounding ring of the gasket and through the cap into a retaining ring that is located adjacent to an under side of the cap.

14. The lid of claim 8, wherein the cap has an undersurface that forms a smooth and continuous surface that extends from above a juice collection area to a pulp exit area of the cap, wherein the lid acts to divert pulp to a pulp collector.

15. The lid of claim 8, wherein the cap has a descending rim that cooperates with a juice stopping rim of a juice collector; and
an angle between an outer surface of the descending rim and an inner surface of the juice stopping rim creates a tapered gap that is most narrow at the bottom.

16. The lid of claim 8, wherein the metal knife is attached to the interior of the feed tube and offset from a center axis of the feed tube so that the center axis of the feed tube does not pass through the metal knife.

17. An electric juicing device comprising a housing and a lid that attaches to the housing, wherein the lid comprises:
a polymeric cap in which is formed an opening;
the opening accommodating and having attached to it, a metal feed tube;
the feed tube having a circumferential flange that is affixed to the cap a gasket being interposed between the flange and the cap; and
the gasket further comprising a neck and a surrounding ring, the neck sealing between the feed tube and a vertical rim of the cap.

18. An electric juicing device comprising a housing and a lid that attaches to the housing, wherein the lid comprises:
   (a) a polymeric cap in which is formed an opening;
   (b) a metal feed tube, accommodated into and attached to the opening, wherein the feed tube has a circumferential flange that is affixed to the cap;
   (c) a gasket interposed between the flange and the cap, wherein the gasket comprises a neck and a surrounding ring, the neck sealing between the feed tube and a vertical rim of the cap; and
   (d) a metal knife attached to a lower interior of the metal feed tube.

* * * * *